(12) United States Patent
Tan et al.

(10) Patent No.: US 8,970,851 B2
(45) Date of Patent: Mar. 3, 2015

(54) DETECTING METHOD AND DEVICE FOR CURVED SURFACE PRECISION OF DISH PARABOLIC REFLECTING MIRROR

(75) Inventors: Xinhua Tan, Xiangtan (CN); Kai Zhu, Xiangtan (CN)

(73) Assignees: Xiangtan Liyuan Electric Tooling Co. Ltd. (CN); Xiangtan Electric Manufacturing Co., Ltd. (CN)

( * ) Notice: Subject to any disclaimer, the term of this patent is extended or adjusted under 35 U.S.C. 154(b) by 0 days.

(21) Appl. No.: 14/237,610

(22) PCT Filed: Apr. 27, 2012

(86) PCT No.: PCT/CN2012/074829
§ 371 (c)(1),
(2), (4) Date: Feb. 7, 2014

(87) PCT Pub. No.: WO2013/037210
PCT Pub. Date: Mar. 21, 2013

(65) Prior Publication Data
US 2014/0204395 A1    Jul. 24, 2014

(30) Foreign Application Priority Data

Sep. 15, 2011   (CN) .......................... 2011 1 0273230

(51) Int. Cl.
*G01B 11/24* (2006.01)
*G01J 1/00* (2006.01)
(Continued)

(52) U.S. Cl.
CPC ........... *G01B 11/245* (2013.01); *G01M 11/005* (2013.01)
USPC ............................ 356/601; 356/213; 356/218

(58) Field of Classification Search
CPC .......... G01N 21/9501; G01N 21/8806; G01N 21/9505; G01N 21/474; G01N 2201/0636; G01N 2021/6463; G01N 21/3581; G01N 21/49; G01N 21/645; G01N 21/956; G01N 15/1434; G01N 15/1436; G01N 15/1459
See application file for complete search history.

(56) References Cited

U.S. PATENT DOCUMENTS 7,140,119 B2   11/2006  Badami et al.

FOREIGN PATENT DOCUMENTS

| CN | 1490125 A | 4/2004 |
|---|---|---|
| CN | 1677052 A | 10/2005 |

(Continued)

OTHER PUBLICATIONS

International Search Report for Application No. PCT/CN2012/074829 dated Jun. 28, 2012.
(Continued)

*Primary Examiner* — Michael P Stafira
(74) *Attorney, Agent, or Firm* — Lerner, David, Littenberg, Krumholz & Mentlik, LLP

(57) ABSTRACT

A method and device for detecting a precision of a dish parabolic reflecting mirror are provided. Accurate coordinate values of positions on an X-axis and a Y-axis may be obtained by adjusting and controlling a double helix lifting mechanism, a 360-degree plane rotary mechanism, a telescoping mechanism, and an extension rod, and using a photoelectric position sensor with a high precision and the extension rod being measured. Then, the curved surface of the dish paraboloid reflecting mirror being detected is obtained by fitting sampling values of the coordinate values of spatial positions of the detecting points at various, and the precision error value by comparing the curved surface of the dish paraboloid reflecting mirror being detected to the theoretical curved surface, thereby realizing detection of the precision of the curved surface of the dish paraboloid reflecting mirror.

10 Claims, 3 Drawing Sheets

(51) Int. Cl.
*G01J 1/42* (2006.01)
*G01B 11/245* (2006.01)
*G01M 11/00* (2006.01)

(56) References Cited

FOREIGN PATENT DOCUMENTS

| CN | 1847785 A | 10/2006 |
| CN | 101285732 A | 10/2008 |
| CN | 101666629 A | 3/2010 |
| CN | 201859016 U | 6/2011 |
| CN | 102128599 A | 7/2011 |
| JP | 03059409 A | 3/1991 |
| JP | 11118472 | 4/1999 |
| JP | 2000088545 A | 3/2000 |
| JP | 2002365160 | * 12/2002 |
| JP | 2007271601 A | 10/2007 |
| JP | 2009145068 A | 7/2009 |
| JP | 2010185804 A | 8/2010 |
| JP | 2013019640 | * 1/2013 |

OTHER PUBLICATIONS

Jia, Lide. Study on key techniques of coordinate measurement for optical aspherics. Chinese doctoral dissertations full-text database engineering science and technology I. Apr. 15, 2011, No. 4, pp. 7-8, II-15, 24-25, 44-45, ISSN 1674-022X.

* cited by examiner

DETECTING METHOD AND DEVICE FOR CURVED SURFACE PRECISION OF DISH PARABOLIC REFLECTING MIRROR

The present application is the national phase entry under 35 U.S.C. §371 of International Application No. PCT/CN2012/074829, titled "DETECTING METHOD AND DEVICE FOR CURVED SURFACE PRECISION OF DISH PARABOLIC REFLECTING MIRROR", filed on Apr. 27, 2012, which claims the priority of Chinese Patent Application No. 201110273230.1, entitled "METHOD AND DEVICE FOR DETECTING PRECISION OF CURVED SURFACE OF DISH PARABOLOID REFLECTING MIRROR", filed with the Chinese State Intellectual Property Office on Sep. 15, 2011, both of which applications are incorporated herein in their entireties by this reference.

TECHNICAL FIELD

The present application relates to the technical field of optical instruments and optical test technology, and particularly to a method and a device for detecting a precision of a curved surface of a dish paraboloid reflecting mirror.

BACKGROUND

A dish paraboloid reflecting mirror is one of the core components in a high-temperature heat collecting system, and is generally used in a solar heat collecting system or a solar heat collector. A curved surface of the dish paraboloid reflecting mirror is of a dish paraboloid shape, and an opening of the curved surface can be designed according to heat requirement. There are two types of reflecting mirrors, a small-diameter dish paraboloid reflecting mirror and a large-diameter dish paraboloid reflecting mirror.

The precision of the curved surface of the dish paraboloid reflecting mirror may directly affect an efficiency of the optical energy concentration in a high-temperature heat collecting process, thus when manufacturing and debugging the dish paraboloid reflecting mirror, an error of the precision of the curved surface thereof is required to be detected so as to improve the dish paraboloid reflecting mirror. The precision error of the curved surface of the large-diameter dish paraboloid reflecting mirror is mainly caused by a K-value error of the reflecting mirror (K-value indicates a K-value coefficient of an aspheric surface which represents a core parameter of the aspheric surface shape), a manufacturing error of a mirror casing of the reflecting mirror and a mounting error of the reflecting mirror. The above errors may cause a non-uniform of sizes of focal spots and an uneven distribution of energy, and even cause damage to a heat collector.

At present, a zero error detecting means is generally utilized in the prior art, that is an auto calibration detection by utilizing a mirror surface to be detected and a standard planar mirror with a diameter matching with that of the mirror surface to be detected. However, it is difficult to detect the precision of the curved surface of the large-diameter dish paraboloid reflecting mirror by the zero error detecting means, and at present, there is no specific instrument for detecting the precision of the curved surface of the large-diameter dish paraboloid reflecting mirror.

Hence, since it is difficult to detect the precision of the curved surface of a dish paraboloid reflecting mirror in the prior art, a device for detecting the precision of the curved surface of the dish paraboloid reflecting mirror with a high precision is urgently needed.

SUMMARY

In view of this, the present application provides a method and a device for detecting a precision of a curved surface of a dish paraboloid reflecting mirror, so as to solve the problems that there is no specific device in the prior art that can detect the precision of the curved surface of the dish paraboloid reflecting mirror with a high precision.

In order to realize the above object, the present application provides the following technical solutions.

A device for detecting a precision of a curved surface of a dish paraboloid reflecting mirror includes:

a mounting support adapted to mount a dish paraboloid reflecting mirror to be detected;

a double helix lifting mechanism perpendicularly connected to the mounting support;

a telescoping mechanism connected to a top end of the double helix lifting mechanism;

a 360-degree plane rotary mechanism perpendicularly connected between the double helix lifting mechanism and the telescoping mechanism;

an extension rod, which is horizontally connected to the telescoping mechanism and horizontally rotatable along with the rotation of the 360-degree plane rotary mechanism;

an X-axis photoelectric position sensor arranged at one end of the extension rod;

a Y-axis photoelectric position sensor arranged at the telescoping mechanism;

a photoelectric digital-to-analog converting device adapted to receive and convert detected numerical values of various detecting points detected by the X-axis photoelectric position sensor and the Y-axis photoelectric position sensor, and obtain coordinate values of spatial positions of the various detecting points; and a master computer adapted to receive the coordinate values of spatial positions of the various detecting points, and determine the precision of the curved surface of the dish paraboloid reflecting mirror being detected.

Preferably, the master computer is adapted to obtain a precision error value of the curved surface of the dish paraboloid reflecting mirror by comparing the curved surface to a theoretical curved surface; and the master computer is adapted to provide corresponding data information in a detecting process, a manufacturing process, or an installing and debugging process of the dish paraboloid reflecting mirror based on the error value.

Preferably, the master computer is adapted to perform the following operations to provide the corresponding data information based on the error value:

fitting sampling values of the received coordinate values of spatial positions of the various detecting points, and obtaining a precision error value by comparing the curved surface of the dish paraboloid reflecting mirror being detected to the theoretical curved surface;

in a case that the precision error value exceeds 1%, displaying a part, which is out of tolerance, of the curved surface of the dish paraboloid reflecting mirror being detected in red on the master computer, while a background color of the curved surface of the dish paraboloid reflecting mirror being detected being gray, and providing the precision error value of the curved surface of the red part in a detection report; and in a case that the precision error value does not exceed 1%, providing information that the dish paraboloid reflecting mirror being detected is qualified.

Preferably, the extension rod has a proximal end extending through the telescoping mechanism and fixed to the telescoping mechanism, and a distal end extending horizontally along the telescoping mechanism, and the X-axis photoelectric position sensor is arranged at the distal end of the extension rod.

Preferably, the device further includes a supporting frame perpendicularly connected to the mounting support, wherein the supporting frame has a top end adapted to support the 360-degree plane rotary mechanism, and a bottom end of the supporting frame and a bottom end of the double helix lifting mechanism are both located inside the mounting support and are fixed by a fixing member.

Preferably, the 360-degree plane rotary mechanism is adjusted according to a preset angle and the double helix lifting mechanism and the telescoping mechanism are adjusted according to a preset height to determine a current detecting point; and the Y-axis photoelectric position sensor connected to the telescoping mechanism and the X-axis photoelectric position sensor connected to one end of the extension rod are adapted to detect the current detecting point being determined, and obtain coordinate values of positions of the current detecting point on an X axis and a Y axis.

Preferably, the master computer is adapted to obtain the precision of the curve surface of the dish paraboloid reflecting mirror being detected by fitting the received coordinate values of spatial positions of the various detecting points.

Preferably, the dish paraboloid reflecting mirror includes a small-diameter dish paraboloid reflecting mirror and a large-diameter dish paraboloid reflecting mirror.

Preferably, for the detecting device according to claims 1 to 4:

determining a current detecting point on the curved surface of the dish paraboloid reflecting mirror by adjusting a double helix lifting mechanism according to a preset height;

obtaining coordinate values of positions of the current detecting point at an X axis and a Y axis by detecting the current detecting point with a Y-axis photoelectric position sensor and an X-axis photoelectric position sensor;

rotating an extension rod by adjusting a 360-degree plane rotary mechanism, detecting the current detecting point by the X-axis photoelectric position sensor, and obtaining coordinate values of positions of detecting points scanned in a range of 360 degrees at the same height as the current detecting point;

receiving and converting the coordinate values of position of the current detecting point on the X axis and the Y axis and the coordinate values of positions of the detecting points scanned in the range of 360 degrees at the same height as the current detecting point by a photoelectric signal digital-to-analog converting device, and determining a coordinate value of a spatial position of the current detecting point; and fitting the obtained coordinate values of spatial positions of various detecting points by a master computer and obtaining a curved surface of the dish paraboloid reflecting mirror.

Preferably, after obtaining the curved surface of the dish paraboloid reflecting mirror:

obtaining a precision error value of the curved surface of the dish paraboloid reflecting mirror by comparing the curved surface of the dish paraboloid reflecting mirror to a theoretical curved surface.

As can be seen from the above technical solution, compared to the prior art, the present application provides a method and a device for detecting the precision of the curved surface of the dish paraboloid reflecting mirror. The accurate coordinate values of positions on the X axis and the Y axis may be obtained by adjusting and controlling the double helix lifting mechanism, the 360-degree plane rotary mechanism, the telescoping mechanism and the extension rod, and using the photoelectric position sensor with a high precision and the extension rod being measured. Then, the curved surface of the dish paraboloid reflecting mirror being detected is obtained by fitting sampling values of the coordinate values of spatial positions of the detecting points at various positions, and the precision error value is obtained by comparing the curved surface of the dish paraboloid reflecting mirror being detected to the theoretical curved surface, thereby realizing detection of the precision of the curved surface of the dish paraboloid reflecting mirror.

BRIEF DESCRIPTION OF THE DRAWINGS

For more clearly illustrating embodiments of the present application or the technical solution in the prior art, drawings referred to describe the embodiments or the prior art will be briefly described hereinafter. Apparently, the drawings in the following description are only several embodiments of the present application, and for the person skilled in the art other drawings may be obtained based on these drawings without any creative efforts.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

As described in the background of the present application, a detecting device in the prior art generally employs the auto calibration detecting means by utilizing a mirror surface to be detected and a standard planar mirror with a diameter matching with that of the mirror surface to be detected, which can not detect the precision of the curved surface of the dish paraboloid reflecting mirror, i.e. can not detect the precision of the curved surface of the large-diameter dish paraboloid reflecting mirror. Hence, the present application provides a device for detecting the curve surface precision of the dish paraboloid reflecting mirror. The device is utilized to detect a curved surface of the dish paraboloid reflecting mirror and a curved surface of the large-diameter dish paraboloid reflecting mirror to obtain the precision of the curved surface of the dish paraboloid reflecting mirror. A specific structure of the detecting device and a process of detecting the precision of the curved surface of the dish paraboloid reflecting mirror are described in detail hereinafter in conjunction with the following embodiments.

First Embodiment

Figure 1:
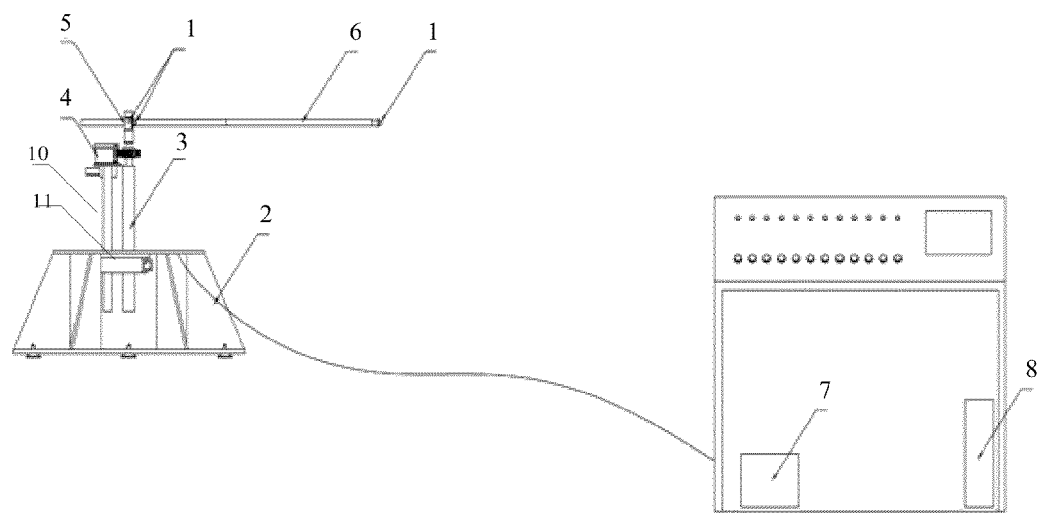
FIG. 1 is a schematic view showing the structure of a device for detecting a precision of a curved surface of a dish paraboloid reflecting mirror according to a first embodiment of the present application.

Referring to FIG. 1, which is a schematic view showing the structure of a device for detecting a precision of the curved surface of a dish paraboloid reflecting mirror according to a first embodiment of the present application. The detecting device mainly includes a photoelectric position sensor 1, a mounting support 2, a double helix lifting mechanism 3, a 360-degree plane rotary mechanism 4, a telescoping mechanism 5, an extension rod 6, a photoelectric digital-to-analog converting device 7 and a master computer 8.

The photoelectric position sensor includes an X-axis photoelectric position sensor 11 and a Y-axis photoelectric position sensor 11. The X-axis photoelectric position sensor 11 is adapted to detect a coordinate value of position of each of detecting points on an X axis and coordinate values of positions of various detecting points scanned in a range of 360 degrees. The Y-axis photoelectric position sensor 11 is adapted to detect a coordinate value of position of each of the detecting points on a Y axis.

A dish paraboloid reflecting mirror to be detected may be mounted at a top end of the mounting support 2. The dish paraboloid reflecting mirror to be detected can be fixed by the mounting support 2 such that it will not move during the detecting process. In addition, a surface of the top end of the mounting support 2 for mounting the dish paraboloid reflecting mirror to be detected may be an arc surface matching the dish paraboloid reflecting mirror to be detected, such that the dish paraboloid reflecting mirror to be detected may be more stable and is not prone to move during the detecting process.

Furthermore, a pulley may be mounted at a bottom end of the mounting support 2, such that the whole detecting device may be moved easily.

The double helix lifting mechanism 3 is perpendicularly connected to the mounting support 2, and has a bottom end extending through the mounting support 2 and located inside the mounting support 2.

The telescoping mechanism 5 is connected to an upper end or a top end of the double helix lifting mechanism 3, and a connection portion between the telescoping mechanism 5 and the double helix lifting mechanism 3 is perpendicularly connected to the 360-degree plane rotary mechanism 4, i.e. the 360-degree plane rotary mechanism 4 is perpendicularly connected between the double helix lifting mechanism 3 and the telescoping mechanism 5.

It is to be noted that, the 360-degree plane rotary mechanism 4 may be further supported and fixed by a supporting frame 10. The supporting frame 10 is perpendicularly connected to the mounting support 2, and a bottom end of the supporting frame 10 and the bottom end of the double helix lifting mechanism 3 are both located inside the mounting support 2 and are fixed by a fixing member 11.

The telescoping mechanism 5 is provided with a Y-axis photoelectric position sensor 12 which is adapted to detect a coordinate value of position of a detecting point on the Y axis when the detecting point is determined by a telescopic height of the telescoping mechanism 5.

The extension rod 6 is horizontally connected to the telescoping mechanism 5, and has a proximal end extending through the telescoping mechanism 5 and fixed on the telescoping mechanism 5, and a distal end horizontally extending along the telescoping mechanism 5. The X-axis photoelectric position sensor 11 is arranged at the distal end of the extension rod 6, and is adapted to detect a coordinate value of position of a current detecting point, at the current height of the telescoping mechanism 5, on the X axis.

The extension rod 6 is able to rotate horizontally along with the rotation of the 360-degree plane rotary mechanism 4, and during the horizontal rotating process, the X-axis photoelectric position sensor 11 is adapted to detect coordinate values of positions of various detecting points scanned in a range of 360 degrees at the same height as that of the current detecting point.

The photoelectric digital-to-analog converting device 7 is adapted to receive detected numerical values of various detecting points detected by the X-axis photoelectric position sensor 11 and the Y-axis photoelectric position sensor 12, and convert the detected numerical values into digital signals, and determine coordinate values of spatial positions of the various detecting points according to the converted digital signals.

The master computer 8 is adapted to receive the spatial position coordinate values of the various detecting points sent from the photoelectric digital-to-analog converting device 7, perform a fitting operation, and obtain the precision of the curved surface of the dish paraboloid reflecting mirror being detected. After obtaining the precision of the curved surface of the dish paraboloid reflecting mirror being detected, the master computer 8 is adapted to compare the obtained precision of the curved surface to a theoretical precision of the curved surface, and obtain a precision error value of the curved surface of the dish paraboloid reflecting mirror.

Then, based on the obtained precision error value of the curved surface, the master computer 8 provides accurate data information corresponding to the detecting process, the manufacturing process, or the installing and debugging process of the dish paraboloid reflecting mirror, such that the dish paraboloid reflecting mirror may meet the requirements in the detecting process, the manufacturing process, or the installing and debugging process.

The provided data information is related to the precision error value of the curved surface.

Sampling values of the obtained spatial position coordinate values of the various detecting points are fitted, and a precision error value is obtained by comparing the curved surface of the dish paraboloid reflecting mirror being detected to the theoretical curved surface.

If the precision error value exceeds 1%, a part, which is out of tolerance, of the curved surface of the dish paraboloid reflecting mirror being detected is displayed in red on the master computer, while the background color of the curved surface of the dish paraboloid reflecting mirror being detected is gray. The precision error value of the curved surface of the red part is provided in a detection report, which means that the precision error value is relatively large, and then a technical staff may determine whether the dish paraboloid reflecting mirror being detected is qualified.

If the precision error value does not exceed 1%, the dish paraboloid reflecting mirror being detected is qualified.

Additionally, the precision error value can be set artificially according to technical requirements on the curved surface of the dish paraboloid reflecting mirror being detected. The part of the curved surface having the precision error value being out of tolerance is displayed in red, and the precision error value of the red part of the curved surface is provided in the detection report, and whether the detected product is qualified can be determined.

It is to be noted that, during the detecting process of the dish paraboloid reflecting mirror, the 360-degree plane rotary mechanism 4 is adjusted according to a preset angle and the double helix lifting mechanism 3 and the telescoping mechanism 5 are adjusted according to a preset height to determine current detecting points one by one. The Y-axis photoelectric position sensor 12 connected to the telescoping mechanism 5 and the X-axis photoelectric position sensor 11 connected to one end of the extension rod 6 detect each of the current detecting points to obtain the coordinate values of position of each of the current detecting points on the X axis and the Y axis.

The number and the position of the current detecting points can be set according to practical requirements, or can be set according to the geometrical characteristic of the dish paraboloid reflecting mirror.

It is to be noted that, an opening of the dish paraboloid reflecting mirror to be detected can be designed according to various heat requirements, and there are two types of reflecting mirrors, a small-diameter dish paraboloid reflecting mirror and a large-diameter dish paraboloid reflecting mirror. A process of detecting the large-diameter dish paraboloid reflecting mirror by the detecting device according to the embodiment of the present application is described in detail hereinafter.

Figure 2:
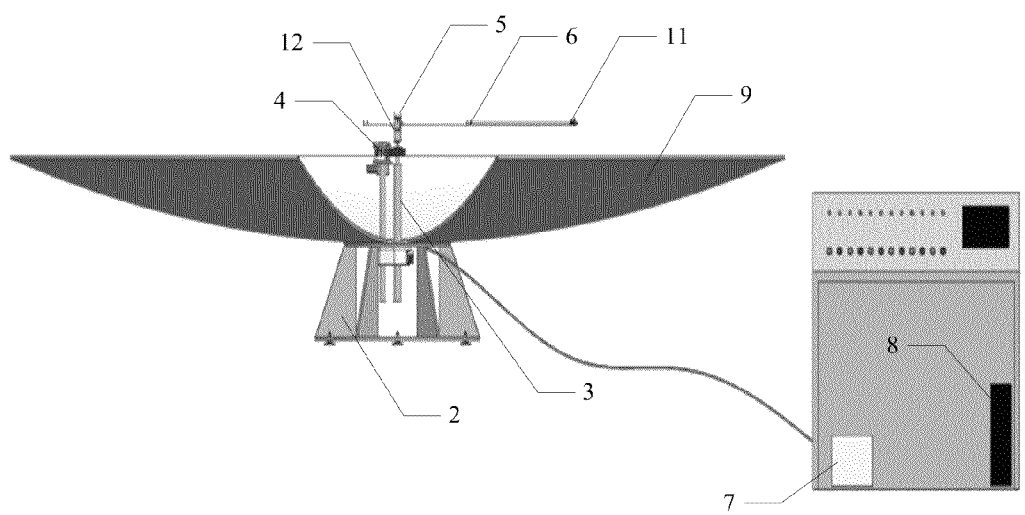
FIG. 2 is a schematic view showing the three-dimensional structure of the device for detecting the precision of the curved surface of the dish paraboloid reflecting mirror according to the first embodiment of the present application.

As shown in FIG. 2, the large-diameter dish paraboloid reflecting mirror 9 to be detected is mounted on the mounting support 2, the double helix lifting mechanism 3 is adjusted according to a preset height, the Y-axis photoelectric position sensor 12 detects the current detecting point to obtain the coordinate value of position of the current detecting point on the Y axis, and the X-axis photoelectric position sensor 11, that is located at the distal end of the extension rod 6 connected to the telescoping mechanism 5, detects the coordinate value of position of the current detecting point on the X axis. The 360-degree plane rotary mechanism is adjusted to rotate the extension rod 6 along with the 360-degree plane rotary mechanism, and then the X-axis photoelectric position sensor 11 located at the extension rod 6 scans detecting points at the same height as the current detecting point in a range of 360 degrees to obtain coordinate values of positions of the detecting points in the range of 360 degrees.

Detected or measured signals from the X-axis photoelectric position sensor 11 and the Y-axis photoelectric position sensor 12 are converted into digital signals via the photoelectric signal digital-to-analog converting device 7, and the coordinate value of a spatial position Z of the current detecting point is determined based on the digital signals.

The precision value of the curved surface of the large-diameter dish paraboloid reflecting mirror 9 being detected is obtained by fitting sampling values of the coordinate values of the spatial positions Z at various positions in the master computer 8. A precision error value of the curved surface is calculated by comparing the precision value of the curved surface to a theoretically precision value of the curved surface of a standard dish paraboloid reflecting mirror which is pre-stored in the mater computer 8, such that the accurate data information may be provided for the detecting process, the manufacturing process, or the installing and debugging process of the dish paraboloid reflecting mirror.

Figure 3:
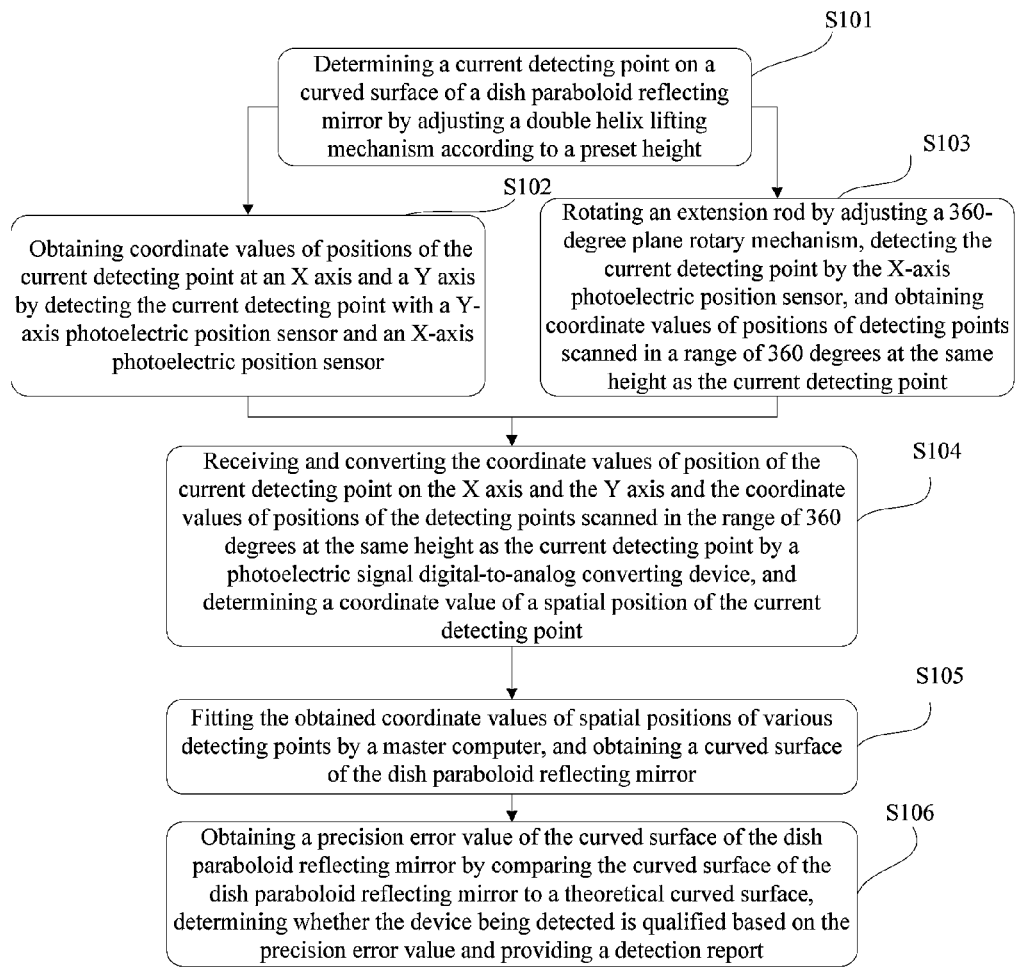
FIG. 3 is a flow chart of a method for detecting the precision of the curved surface of the dish paraboloid reflecting mirror according to the first embodiment of the present application.

Based on the device for detecting the precision of the curved surface of the dish paraboloid reflecting mirror according to the embodiment of the present application, the present application further provides a method for detecting the precision of the curved surface of a dish paraboloid reflecting mirror. As shown in FIG. 3, the method includes the following steps.

Step S101 is to determine a current detecting point on a curved surface of a dish paraboloid reflecting mirror by adjusting a double helix lifting mechanism according to a preset height.

Step S102 is to obtain coordinate values of positions of the current detecting point at an X axis and a Y axis by detecting the current detecting point with a Y-axis photoelectric position sensor and an X-axis photoelectric position sensor.

Step S103 is to rotate an extension rod by adjusting a 360-degree plane rotary mechanism, to detect the current detecting point by the X-axis photoelectric position sensor, and to obtain coordinate values of positions of detecting points scanned in a range of 360 degrees at the same height as the current detecting point.

Step S104 is to receive and convert the coordinate values of position of the current detecting point on the X axis and the Y axis and the coordinate values of positions of the detecting points scanned in the range of 360 degrees at the same height as the current detecting point by a photoelectric signal digital-to-analog converting device, and determine a coordinate value of a spatial position of the current detecting point.

Step S105 is to fit the obtained coordinate values of spatial positions of various detecting points by a master computer, and obtain a precision value of a curved surface of the dish paraboloid reflecting mirror.

The method further includes the following step after obtaining the precision value of the curved surface of the dish paraboloid reflecting mirror.

Step S106 is to obtain a precision error value of the curved surface of the dish paraboloid reflecting mirror by comparing the precision value of the curved surface of the dish paraboloid reflecting mirror to a theoretical precision value of the curved surface.

The detecting method according to the embodiment of the present application may be used for the detecting device according to the embodiment of the present application Therefore, the device related to the detecting method has the same structure as that of the detecting device according to the above embodiment, which will not be described herein.

The precision of curved surfaces of the large dish paraboloid reflecting mirrors having various diameters may be detected by the detecting method according to the embodiments of the present application. In other words, the precision error value of the curved surface of the dish paraboloid reflecting mirror being detected may be calculated by comparing the samples, which are obtained by rotary scanning at the X axis and the Y axis, to the precision of the curved surface of a standard model of a dish paraboloid reflecting mirror, thereby solving the problem of detecting a precision value of a curved surface of a large-diameter dish paraboloid reflecting mirror.

Further, based on the obtained precision error value of the curved surface, accurate data information corresponding to the detecting process, the manufacturing process, or the installing and debugging process of the dish paraboloid reflecting mirror may be provided to enable the dish paraboloid reflecting mirror to meet the requirements in the detecting process, the manufacturing process, or the installing and debugging process.

In summary, with the detecting method and the detecting device according to the present application, the extension rod is measured by the photoelectric position sensor with a high precision to ensure the precision of coordinate values at the X axis and the Y axis of samples, thereby ensuring the system precision of the device for detecting the precision of the curved surface of the large-diameter dish paraboloid reflecting mirror. Additionally, various points on the curved surface of the large-diameter dish paraboloid reflecting mirror may be more easily and conveniently scanned by adjusting and controlling the double helix lifting mechanism, the 360-degree plane rotary mechanism, the telescoping mechanism and the extension rod, thereby significantly improving the work efficiency.

The calculating process described in the embodiments herein can be directly implemented by hardware, or a software module performed by a processor, or the combination of the hardware and the software module. The software module can be arranged in a storage medium, such as a random access memory (abbreviated as RAM), a memory, a read only memory (abbreviated as ROM), an electrically programmable ROM, an electrically erasable programmable ROM, a register, a hard disk, a removable disk, a compact disc read only memory (abbreviated as CD-ROM) or other storage mediums known in the art.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A device for detecting a precision of a curved surface of a dish paraboloid reflecting mirror, comprising:
   a mounting support adapted to mount a dish paraboloid reflecting mirror to be detected;
   a double helix lifting mechanism perpendicularly connected to the mounting support;
   a telescoping mechanism connected to a top end of the double helix lifting mechanism;
   a 360-degree plane rotary mechanism perpendicularly connected between the double helix lifting mechanism and the telescoping mechanism;
   an extension rod, which is horizontally connected to the telescoping mechanism and horizontally rotatable along with the rotation of the 360-degree plane rotary mechanism;
   an X-axis photoelectric position sensor arranged at one end of the extension rod;
   a Y-axis photoelectric position sensor arranged at the telescoping mechanism;
   a photoelectric digital-to-analog converting device adapted to receive and convert detected numerical values of various detecting points detected by the X-axis photoelectric position sensor and the Y-axis photoelectric position sensor, and obtain coordinate values of spatial positions of the various detecting points; and
   a master computer adapted to receive the coordinate values of spatial positions of the various detecting points, and determine the precision of the curved surface of the dish paraboloid reflecting mirror being detected.

2. The device according to claim 1, wherein,
   the master computer is adapted to obtain a precision error value of the curved surface of the dish paraboloid reflecting mirror by comparing the curved surface to a theoretical curved surface; and
   the master computer is adapted to provide corresponding data information in a detecting process, a manufacturing process, or an installing and debugging process of the dish paraboloid reflecting mirror based on the error value.

3. The device according to claim 2, wherein the master computer is adapted to perform the following operations to provide the corresponding data information based on the error value:
   fitting sampling values of the received coordinate values of spatial positions of the various detecting points, and obtaining a precision error value by comparing the curved surface of the dish paraboloid reflecting mirror being detected to the theoretical curved surface;
   in a case that the precision error value exceeds 1%, displaying a part, which is out of tolerance, of the curved surface of the dish paraboloid reflecting mirror being detected in red on the master computer, while a background color of the curved surface of the dish paraboloid reflecting mirror being detected being gray, and providing the precision error value of the curved surface of the red part in a detection report; and
   in a case that the precision error value does not exceed 1%, providing information that the dish paraboloid reflecting mirror being detected is qualified.

4. The device according to claim 2, wherein the extension rod has a proximal end extending through the telescoping mechanism and fixed to the telescoping mechanism and a distal end extending horizontally along the telescoping mechanism, and the X-axis photoelectric position sensor is arranged at the distal end of the extension rod.

5. The device according to claim 1, further comprising a supporting frame perpendicularly connected to the mounting support, wherein
   the supporting frame has a top end adapted to support the 360-degree plane rotary mechanism, and
   a bottom end of the supporting frame and a bottom end of the double helix lifting mechanism are both located inside the mounting support and are fixed by a fixing member.

6. The device according to claim 5, wherein
   the 360-degree plane rotary mechanism is adjusted according to a preset angle and the double helix lifting mechanism and the telescoping mechanism are adjusted according to a preset height to determine a current detecting point; and
   the Y-axis photoelectric position sensor connected to the telescoping mechanism and the X-axis photoelectric position sensor connected to one end of the extension rod are adapted to detect the current detecting point being determined, and obtain coordinate values of positions of the current detecting point on an X axis and a Y axis.

7. The device according to claim 1, wherein
   the master computer is adapted to obtain the precision of the curve surface of the dish paraboloid reflecting mirror being detected by fitting the received coordinate values of spatial positions of the various detecting points.

8. The device according to claim 1, wherein the dish paraboloid reflecting mirror comprises a small-diameter dish paraboloid reflecting mirror and a large-diameter dish paraboloid reflecting mirror.

9. A method for detecting a precision of a curved surface of a dish paraboloid reflecting mirror adapted to the device according to claim 1, comprising:
   determining a current detecting point on the curved surface of the dish paraboloid reflecting mirror by adjusting a double helix lifting mechanism according to a preset height;
   obtaining coordinate values of positions of the current detecting point at an X axis and a Y axis by detecting the current detecting point with a Y-axis photoelectric position sensor and an X-axis photoelectric position sensor;
   rotating an extension rod by adjusting a 360-degree plane rotary mechanism, detecting the current detecting point by the X-axis photoelectric position sensor, and obtaining coordinate values of positions of detecting points scanned in a range of 360 degrees at the same height as the current detecting point;

receiving and converting the coordinate values of position of the current detecting point on the X axis and the Y axis and the coordinate values of positions of the detecting points scanned in the range of 360 degrees at the same height as the current detecting point by a photoelectric signal digital-to-analog converting device, and determining a coordinate value of a spatial position of the current detecting point; and fitting the obtained coordinate values of spatial positions of various detecting points by a master computer and obtaining a curved surface of the dish paraboloid reflecting mirror.

10. The method according to claim 9, further comprising the following step after obtaining the curved surface of the dish paraboloid reflecting mirror:

obtaining a precision error value of the curved surface of the dish paraboloid reflecting mirror by comparing the curved surface of the dish paraboloid reflecting mirror to a theoretical curved surface.

* * * * *